United States Patent [19]

Horn et al.

[11] 4,052,602

[45] Oct. 4, 1977

[54] LOAD AND RADIUS INDICATING SYSTEM

[75] Inventors: Robert Horn, Richardson; Raymond J. Slovacek, Dallas, both of Tex.

[73] Assignee: Forney Engineering Company, Addison, Tex.

[21] Appl. No.: 604,523

[22] Filed: Aug. 14, 1975

[51] Int. Cl.[2] ........................ G08B 21/00; G06F 15/20

[52] U.S. Cl. ................................ 364/424; 212/39 A; 340/267 C; 364/567

[58] Field of Search ................ 235/150.2, 193, 151.33; 340/267 C; 212/39 A; 37/116; 116/124 F

[56] References Cited

U.S. PATENT DOCUMENTS

| | | | |
|---|---|---|---|
| 3,534,355 | 10/1970 | Fathauer | 340/267 C |
| 3,638,211 | 1/1972 | Sanchez | 340/267 |
| 3,740,534 | 6/1973 | Kezer et al. | 340/267 C X |
| 3,819,922 | 6/1974 | Horn et al. | 340/267 C X |

*Primary Examiner*—Joseph F. Ruggiero
*Attorney, Agent, or Firm*—Marvin A. Naigur; John E. Wilson

[57] ABSTRACT

A load tensiometer transducer, a boom angle transducer and a boom length transducer are operatively connected to a telescopic variable boom length and crane product. Boom load, angle and length analog signal control logic, responsive to the signals of each transducer, receives, amplifies, and converts the signals into corresponding digital signals that are continuously processed with data read from one of a plurality of selected memory circuits in which information based on the configuration of the crane in use is stored. Digital output signals are produced by the control logic for use in operating a digital radius readout, allowable load readout, and actual load readout, respectively.

5 Claims, 3 Drawing Figures

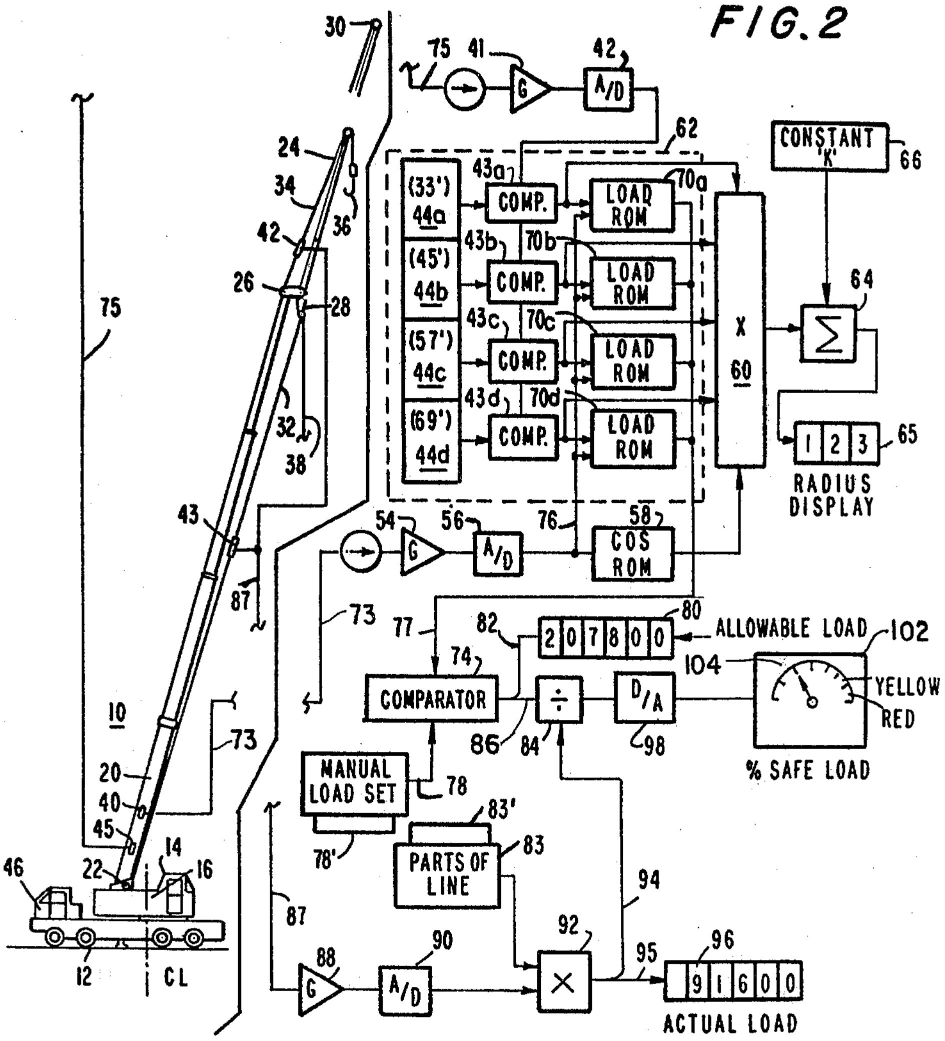
FIG. 1
FIG. 2
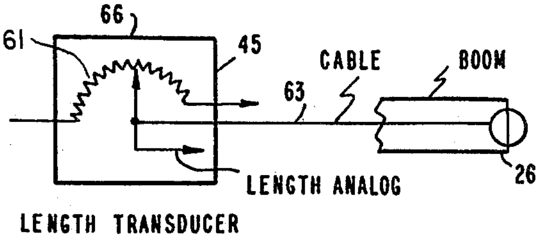
FIG. 3

LOAD AND RADIUS INDICATING SYSTEM

BACKGROUND OF THE INVENTION

In the operation of heavy telescopic variable boom length cranes, a substantial number of serious accidents occur through the hoisting of large weights and changing both the length and angle of the boom. As the angle subtended between the horizontal surface on which the crane rests and the boom is decreased, the moment of force exerted on the crane by the suspended weight increases, thereby increasing the tendency of the crane to tip over. As the boom length is increased, this tendency is similarly increased. Thus, a very real need exists for clear and accurate information regarding actual crane operating conditions. This information must be quickly and accurately provided to the crane operator, which will improve his ability to operate the crane safely. Such information must be calculated from data based on the geometrical configuration of the particular crane in use, as well as on the relative weight of the load, boom angle and length existing at the time the desired information is provided.

Of primary interest to the crane operator for safe operation of the crane is an indication of the percent of safe load at which the crane is operating. As the boom moves upwardly and downwardly in handling each load, the percent safe load changes accordingly and instant calculation is required which is continuous as the crane operates.

Various safety factors are required by legal regulations for the cable, boom, and sheaves used in crane hoist apparatus. Also, visual and audible warnings are necessary to assist the operator operating the crane within the design limits established by the crane manufacturer. The crane operator needs accurate and continuous information relating to the vital conditions affecting safe crane operation, before safe limits are exceeded, i.e., before such warnings actually go into operation, or as the unsafe conditions bringing about such warnings are approached. The geometry of the crane configuration requires automatic trigonometric calculations for the percent safe load and load radius, which are varying functions of the boom angle and length, and which may vary as the load is handled. Also, the parameter configuration data for such calculations must always be taken into consideration in the processing thereof for each crane, and this varies with different crane manufacturers' specifications.

Thus, the desired information must be based on data which conforms to the configuration of the crane in use. It is desirable to provide a modular system which can be adapted for use with any desired one of a plurality of different presently available crane configurations. In accordance with the present invention, this is accomplished by a universally applicable system which can be equipped with selectable memory circuits such that the system is programmed to handle the configuration of any variable boom length type crane that is presently on the market.

There is also at present great need for a universal system having modular units that can be made in production, with each suitable for use with any known variable boom length type of crane. This is accomplished by the present system which comprises, in addition to several sensors, a programmable logic and control unit, and at least one display unit, each of which is easily mounted on the crane at appropriate locations.

The use and handling of as few analog components as possible is also highly desirable in systems that are exposed to severe weather and operating conditions, since they are subject to error and drifting due to temperature variations and age. The maximum use of digital type equipment is a feature of the present invention, along with the use of a minimal amount of analog equipment, as only the boom angle, length, load and percent safe load indicator units use analog signal circuits.

SUMMARY OF THE INVENTION

A load tensiometer transducer, a boom angle transducer and a boom length transducer are operatively connected to a telescopic variable boom length and crane product. Boom load, angle and length analog signal control logic, responsive to the signals of each transducer, receives, amplifies, and converts the signals into corresponding digital signals that are continuously processed with data read from one of a plurality of selected memory cicuits in which information based on the configuration of the crane in use is stored. Digital output signals are produced by the control logic for use in operating a digital radius readout, allowable load readout, and actual load readout, respectively.

BRIEF DESCRIPTION OF THE DRAWINGS

The above brief description, as well as further objects, features, and advantages of the present invention will be more fully appreciated by reference to the following detailed description of a presently preferred but nonetheless illustrative embodiment in accordance with the present invention, when taken in connection with the accompanying drawings wherein:

FIG. 1 is an elevational view of a load handling variable boom length type crane equipped with a safe load information indicating system of the present invention;

FIG. 2 is a circuit block diagram of the safe load information indicating system, with the broken lines indicating the connection to the crane of FIG. 1; and FIG. 3 is a schematic diagram of the boom length transducer electrical circuit.

DESCRIPTION OF THE PREFERRED EMBODIMENTS

FIG. 1 shows a variable boom length load-hoisting crane 10, which includes a self-propelled vehicle 12 on which a cab housing 14 is mounted for horizontal rotation about a vertical axis 16. A boom 20 is pivoted to the housing 14 at 22, for movement thereabout upwardly and downwardly in a vertical plane as the crane is operated. A jib 24 is attached to the boom 20, near its free end. Boom 20 and the jib 24 are provided with sheaves 28 and 30, respectively, near their free ends. The sheaves 28 and 30 are provided with load-carrying lines or cables 32 and 34 and have load hooks 36 and 38 depending from the free ends of the jib 24 and boom 20, respectively.

Mounted in a convenient location on the boom 20 is a boom angle transducer unit 40. The transducer unit 40 is adapted for continuously sensing the angle of the longitudinal axis of the boom with the horizontal axis of the crane 10 and supplies an analog output signal corresponding to such angle.

Load handling cables 32 and 34 are provided with tensiometer units 42 and 43, respectively, the output signal of a selected one of which corresponds to the weight of the load on hook 36 or hook 38, as the case may be.

Boom length transducer 45, detailed in FIG. 3, includes a retractable cable 63 driving a potentiometer 61. The cable is attached to the free end 26 of the telescoping boom 20 and/or jib 24 to give an indication of boom length.

It is intended that a display will be located in the vehicle cab 14 for the operator of crane 10. Also mounted in the cab 14 is a control and logic module for calculating the desired safety information from storage data based on crane configuration in conjunction with information provided by signals from manual sets, the angle and length transducer outputs and a selected one of the cable tensiometers for automatically controlling the display output.

Referring to FIG. 2, boom angle transducer (BAT) 40 produces an output (B) which is amplified at 54. A digital output signal of analog to digital (A/D) converter 56 is applied to LOAD Read Only Memory (LOAD ROM) circuits 70 *a–d* via line 76. The output of a selected one of the LOAD ROM circuits 70 *a–d* determines allowable load and is supplied to a solid-state comparator circuit 74 by a connecting circuit 77. The comparator circuit 74 is provided with a manual load set input circuit 78 which is controlled by the thumb set 78'. Manual load set 78 defines an allowable load signal which can override the allowable load output of the LOAD ROM outputs 70 *a–d;* the resulting output signal of the comparator circuit 74 of FIG. 2 is applied to the input of an allowable load digital display circuit 80 by a circuit 82, as well as to a solid-state dividing (÷) circuit 84 by a circuit 86. It should be understood that the output of comparator 74 is, for safety reasons, always the lesser of the outputs of manual load set circuit 78 of LOAD ROM 70 *a–d.*

A dividing circuit 84 receives a digital load signal from boom line tensiometer unit 43 over circuit 87, amplifier 88, analog to digital (A/D) converter 90, multiplier (×) circuit 92, and lead 94. A manually operated jib selector switch (not shown) is used to select the tensiometer 42 in the whip/jib line 32 when the latter is in use. A branch 95, of lead 94 also carries the digital output signal of the multiplier circuit 92 to an actual load diaplay circuit 96.

The dividing circuit 84 computes the percentage relationship of the allowable load signal from comparator circuit 74 and the actual load signal from multiplier circuit 92. A digital percent of safe load signal output of divider 84 is then converted in digital to analog (D/A) circuit 98 for driving percent safe load meter 102 over an arcuate dial 104 calibrated in percentages (0 to 120%).

The output signal from a Cosine Read Only Memory circuit (COS-ROM) 58 is a digital signal proportional to the cosine of the boom angle signal input from A/D unit 56. The cosine signal is multiplied (×) in circuit 60 by a second digital signal, representative of boom length, from load length range circuit 62, which is directly proportional to length ranges as the boom length changes in use.

In U.S. Pat. No. 3,819,922, the operation of the individual circuits providing the digital and analog signals are explained in detail. The present discussion is concerned with that part of the system which provides boom length information to the system so that, load radius for a certain boom length, can be determined and thereafter allowable load can be determined.

In FIG. 3 there is illustrated boom length transducer 45 which is a resistive potentiometer 61 having a retractable cable 63 therein. The cable is attached to the end of the boom 26, as the boom is extended or retracted, the resistance of potentiometer 61 changes providing an analog of length signal. The boom length transducer 45 illustrated is a simplified schematic of the function of presently available modes such as EATON Model #D-26597 or Houston Scientific #1900–1200.

The analog boom length signal (A) is conducted over line 75 to amplifier 41, analog to digital converter (A/D) 42 and a set of comparators 43 *a–d.* The comparators 43 *a–d* each receive a second signal from a set of digital length set circuits 44 *a–d.* Each circuit 44 *a–d* provides an output corresponding to a theoretical boom length in feet or other appropriate units. For example, circuit 44*a* provides a signal corresponding to 33 feet. If the boom length is less than 33 feet, comparator 43*a* provides an output. Similarly circuits 44 *b–c* produce 45', 57' and 69' signals (these length ranges are illustrative only) and corresponding comparators 43 *b–d* produce outputs only when its corresponding range is reached. Each LOAD ROM circuit 70 *a–d* operates similarly as in U.S. Pat. No. 3,819,922 except that instead of a manual load set as in that disclosure, the present system has a variable load set as generated by boom length transducer 45, comparators 43 *a–d* and length set signal generators 44 *a–d.*

Each LOAD ROM 70 *a–d* receives one input from its corresponding respective comparator 43 *a–d* and another digital input signal corresponding to boom angle from the output of A/D converter 56. Each LOAD ROM 70 *a–d* computes the allowable load for the particular boom angle and boom length and conducts same to comparator 74 and multiplier 60. As previously mentioned, the allowable load output of LOAD ROM 70 *a–d* is compared to an input of manual load set circuit 78 generating the input set by the operator corresponding to a maximum allowable load for the boom. The comparator 74 detects the lower input for safety, and displays same at 80.

The digital output signal of comparators 43 *a–d* yielding a length signal and the output of COS-ROM 58 proportional to the radius of the boom along the horizontal are applied to multiplier circuit 60 for providing a load radius calculation. By adding or subtracting, depending on the crane design, a digital signal (constant K) is generated in circuit 66 proportional to the distance between the boom pivot pin 22 and the center of rotation of the crane illustrated by center bore CL in FIG. 1. A digital signal is calculated by summing circuit 64 which represents the true "load radius" which is displayed at digital readout 65.

Considering only the main line load transducer 43 of FIG. 1 (the fast or whip line transducer 42 functions essentially in the same manner), the output (C) thereof is an analog signal directly proportional to load.

To obtain the hook load with which the operator is most interested, it is necessary to multiply the line tension developed by the tensiometer 43 by the parts of lines (number of lines with which the hook 38 is rigged). This is provided by a manually set parts of line circuit 83, and multiplier circuit 92 into which the digital signals to be multiplied are fed to load display 96.

Signal (B) corresponding to boom angle is carried over line 73 and is used by way of lead 76 to address the previously programmed table of LOAD ROMS 70 *a–d.* Each LOAD ROM circuit 70 *a–d* is programmed to contain the crane manufacturer's load table for a specific crane configuration (i.e., counterweight, crawler position, etc.).

The signal (A) delivered over line 75 carrying boom length information is also used to address LOAD ROMS 70 *a–d.* The output of the selected LOAD ROM circuit 70 is a digital signal proportional to allowable load for that length.

Signal (C) carried over line 87 is proportional to hook load. Actual hook load signal 94 is divided at 84 by allowable load output 86 of comparator 74 to yield the percent of safe load output which is displayed at meter 102 after being processed through the D/A converter 98.

The digital "Allowable Load" signal is processed in a manner similar to the "Actual Load" signal and both are displayed digitally to the crane operator at readouts 80 and 96 respectively.

The load tables for a particular crane configuration are programmed into Read Only Memory modules which are installed in the control and logic module. Each system is furnished with such modules programmed for different crane configurations. The preprogrammed memory modules applicable to the new rigging are chosen by positioning a switch (not shown) on the control and logic module. Additional memory modules can be furnished to satisfy more crane configurations and existing modules can be reprogrammed if a particular configuration is modified or completely eliminated.

The system of the present invention provides information to a crane operator which will improve his ability to safely operate the crane. A typical system includes instrumentation mounted on a crane boom, a control and logic module, and an operator display unit. The boom length, line tension, and angle of the boom are continuously monitored by the instruments. Signals are terminated from the sensors to the control and logic unit which computes the data and sends it on to the operator display unit. Of primary interest to the operator is the indication of the percent of safe load at which the crane is operating; and other information is also displayed which will allow for more efficient operation of the equipment.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A load and radius indicating system for a variable boom length type crane comprising: load and radius displays, each mounted for view by an operator for providing indication of load and radius parameters of the crane respectively;

sensors including a line load tensiometer transducer, boom angle transducer and boom length transducer which are responsively coupled to the crane for producing respective analog outputs representative of load, boom angle and boom length;

control circuit means responsively coupled to each of said transducers for delivering control outputs for driving said displays, said control circuit including memory means programmable with data based on the configuration of the crane in use for delivering selected memory outputs, with said control circuits means being responsive to said memory outputs and said transducer outputs for generating said control outputs in accordance with the particular operating configuration of the crane as the load, boom angle and boom length are varied, and also including boom length comparator means having a set of inputs corresponding to a selected operating range of boom length test inputs responsive to the boom length signal with said comparators producing an operating range output when the boom length signal corresponds to the set input for the particular operating range of the crane.

2. A load and radius indicating system according to claim 1, wherein the memory means includes: load Read Only Memory (ROM) circuit means preprogrammed with crane data, said ROM circuit means responsive to the operating range output of said comparator means and the digital boom angle signal to produce an output corresponding to a permissible maximum load for the operating range of the crane.

3. A load and radius indicating system for a variable boom length type crane comprising: load and radius displays, each mounted for view by an operator for providing indication of load and radius parameters of the crane respectively;

sensors including a line load tensiometer transducer, boom angle transducer and boom length transducer which are responsively coupled to the crane for producing respective analog outputs representative of load, boom angle and boom length;

control circuit means responsively coupled to each of said transducers for delivering control outputs for driving said displays, said control circuit including memory means programmable with data based on the configuration of the crane in use for delivering selected memory outputs, with said control circuit means being responsive to said memory outputs and said transducer outputs for generating said control outputs in accordance with the particular operating configuration of the crane as the load, boom angle and boom length are varied;

said boom length transducer including a cable operated potentiometer having the cable coupled at a free end to a corresponding free end of the boom and the other end to the potentiometer being fixed to the boom at a selected fixed reference point and driven in correspondence with cable length, and the output voltage of the potentiometer corresponding to the analog of the boom length.

4. A load and radius indicating system for use in connection with cranes having a boom capable of being varied in length comprising: a boom angle transducer unit adapted to be mounted on said boom for producing a boom angle signal output; a load line tensiometer transducer adapted to be associated with a selected load bearing line of said crane for producing a load signal output; a boom length transducer adapted to be mounted on said boom for producing a signal output indicative of the operating length of said boom; control logic means adapted to be responsive to each of the outputs of said transducers for producing signals indicative of load, radius and percent of safe load for the particular boom length; load and radius indicator means responsive to said control logic signals including a percent of safe load meter and continuous load radius digital readout in appropriate units for providing a suitable display for the particular boom length; and analog to digital control means responsive to each of said transducers for continuously converting the analog signal from each of said transducers into a corresponding digital signal, said digital control means including comparator means with pre-set length inputs responsive to the boom length digital signal for producing outputs corresponding to a boom length operating range as the boom length is varied during operation of the crane.

5. A load and radius indicating system according to claim 4, including multiplier means coupled to said comparator means and said ROM circuit means receiving the outputs from said comparator means and said ROM circuit means, such that the radius of the load is calculated in accordance with the boom length and boom angle.

* * * * *